United States Patent Office.

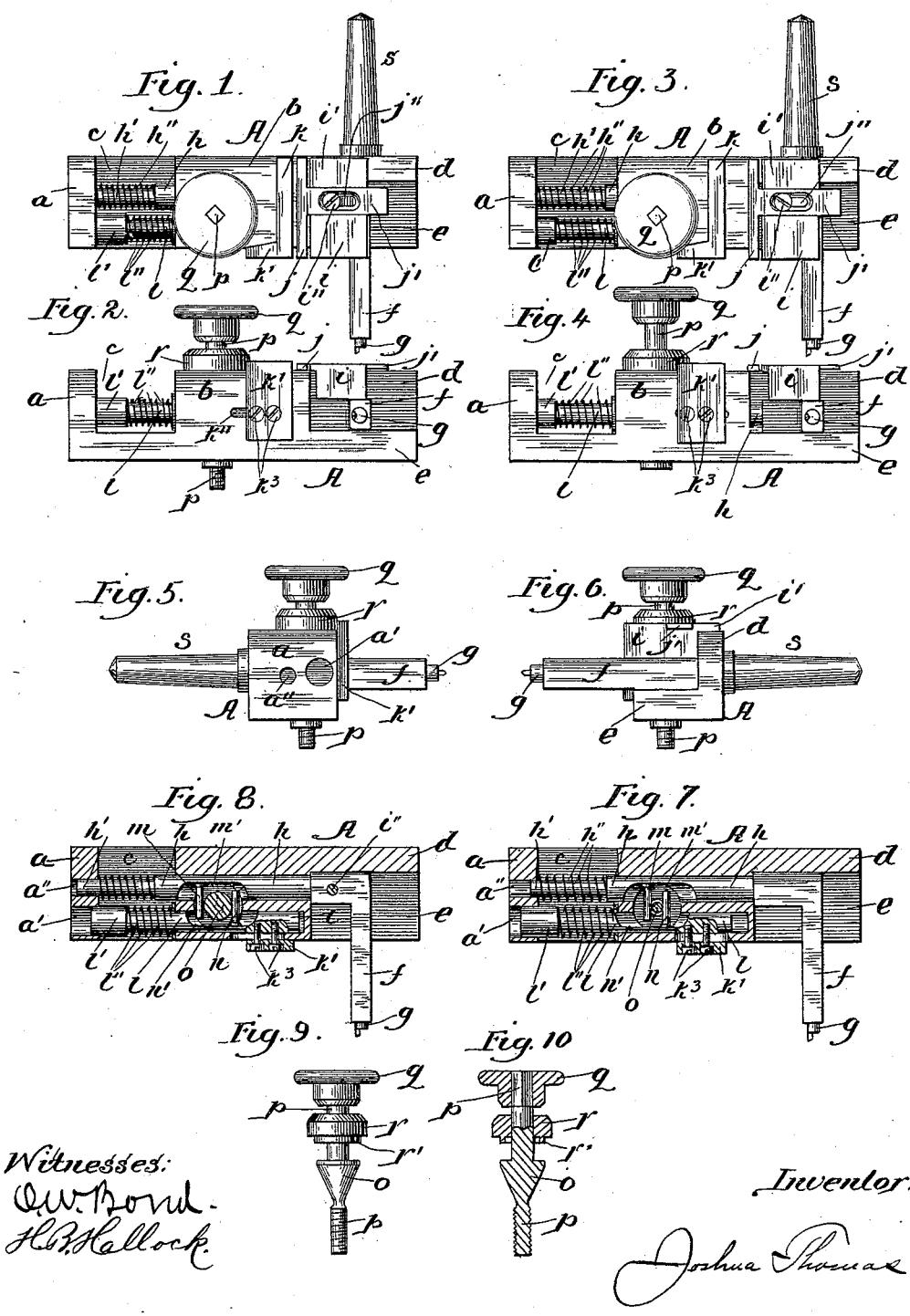

JOSHUA THOMAS, OF ELGIN, ILLINOIS.

JEWELING-TOOL.

SPECIFICATION forming part of Letters Patent No. 415,006, dated November 12, 1889.

Application filed March 15, 1889. Serial No. 303,447. (No model.)

*To all whom it may concern:*

Be it known that I, JOSHUA THOMAS, a subject of the Queen of England, residing at Elgin, in the county of Kane and State of Illinois, have invented certain new and useful Improvements in Jeweling-Tools for Watch-Makers; and I do hereby declare that the following is a full, clear, and exact description of the invention, which will enable others skilled in the art to which it pertains to make and use the same, reference being had to the accompanying drawings, forming a part hereof, in which—

Figure 1 is a top or plan view showing the holding-jaws for the jewel closed; Fig. 2, a side elevation with the parts as shown in Fig. 1; Fig. 3, a top or plan view with the holding-jaws opened to their full capacity; Fig. 4, a side elevation with the parts as shown in Fig. 3; Fig. 5, an elevation of the tail end of the tool; Fig. 6, an elevation of the head end of the tool; Fig. 7, a transverse longitudinal section with the parts as shown in Figs. 3 and 4; Fig. 8, a transverse longitudinal section with the parts as shown in Figs. 1 and 2; Figs. 9 and 10, a side elevation and a longitudinal section, respectively, of the screw for moving the jaws.

The parts are shown in the figures twice the ordinary size for the purpose of better illustration.

The object of this invention is to construct a tool by the use of which watch-jewels can be quickly and accurately set, and have such tool effective in performing its work and reliable in accurately centering the jewel, and this without regard to the diameter of the jewel; and the nature of the invention consists in providing holding-jaws to retain the jewel, which jaws, by the act of clasping the jewel, also center the cutter for the hole for the jewel for such cutter to operate equidistant on all sides from the center of the hole around which the jewel is to be set; in providing a cutting-tool adjustable by and with the movement of the jewel-holding jaws to properly cut the hole for the jewel; in providing sliding bars for actuating the holding-jaws, and by the movement of one of which bars the cutter will be set; in providing a cone carried by a screw for moving the sliding bars in opposite directions simultaneously and equally in length of travel; in providing holding-jaws for the jewel, each of which travels half the distance required to receive and hold the jewel, and a cutter adjustable with the movement of the jaws, and in the several parts and combinations of parts hereinafter described, and pointed out in the claims as new.

In the drawings, A represents a block or head furnishing the support for the several parts of the tool, which head is to be connected with the stock of an ordinary watchmaker's lathe. This head or block is rectangular in cross-section, and its tail end has a wall $a$, through which are holes $a'$ and $a''$, and the center of the block is left full to form a wall or body $b$, between the end of which and the inner face of the wall $a$ is an opening $c$. The head end of the head or block A has a side wall $d$, running back to the center $b$, and this end of the head or block is cut away from the side walls forward and from the end of the center $b$ to the end of the block to form an opening $e$, in which opening the rear end of the shank $f$ of the cutter can be moved forward and back. The shank $f$ has at its forward end a cutter $g$, formed of a round body and a projecting bit at one side, as usual, and this shank is attached to or formed with a bar $h$, the body of which is round or circular in cross-section, which bar at its outer or tail end $h'$ is of a less diameter than the bar $h$ and enters the hole $a''$ in the wall $a$, and around the end $h'$ and between the wall $a$ and end of the bar $h$ is a coiled spring $h''$, by which the sliding bar $h$ is advanced. A block $i$ is located above the tool-shank $f$, and is attached to the sliding bar by a screw $i''$, and this block, on the side adjacent to the wall $d$, has a lip $i'$ overlapping the wall $d$. Against the face of the wall the end of the block $i$ comes in contact, so that by the lip $i'$ and the end of the block $i$ such block is guided and held by the wall $d$. A jaw $j$ is connected with the block $i$ by an arm $j'$, which fits into a groove in the top of the block, and this arm $j'$ has a slot $j''$, through which the screw $i''$ passes, and by means of which the jaw $j$ can be moved in or out as required for centering purposes when the jaws are closed, and this jaw $j$, as shown, is of greater length than the thickness of the head or block $a$, corresponding in length to the length of the block $i$. A jaw $k$ is located adjacent to the jaw $j$ and coacts therewith, and is of a corresponding length, and this jaw $k$ is carried by a plate $k'$, running down the side of the head or block A from the center $b$, in which center is a slot $k''$ for the passage of screws or pins $k^3$, by means of which the plate $k'$ is attached to a sliding bar $l$. The sliding bar $l$ is round in cross-section, and this bar and the bar $h$ are located side by side in suitable holes therefor in the center $b$, and the bar $l$, at its tail or rear end, has a head $l'$, which enters a hole $a'$ in the wall $a$, and between the head $l'$ and the end of the center $b$, around the bar $l$, is a coiled spring $l''$, by means of which the bar $l$ is receded, its movement from the spring $l''$ being in the opposite direction to the movement of the bar $h$ from its spring $h''$, and the movement of the bar $l$ is limited by the slot $k''$ in its advance. The face of the bar $h$ adjacent to the bar $l$ has projecting out therefrom a pin $m$, and the corresponding face of the bar $l$ has projecting out therefrom a pin $n$, and the face of the bar $h$ adjacent to the pin $m$ is cut away, as at $m'$, and the bar $l$, adjacent to the pin $n$, is cut away, as at $n'$, so as to leave a space for the travel of the pins, and a circular portion for the actuating-cone $o$, by which the bars $h$ and $l$ are moved. The cone $o$ is formed on a screw or stem $p$, the lower end of which is screw-threaded and enters a screw-threaded opening therefor in the head or block A, and this screw or stem $p$ is entered between the pins $m$ and $n$ for such pins to lie in contact with the face of the cone, and so that by forcing the cone down the pins $m$ and $n$ will be separated for the pin $m$ to recede the bar $h$ and the pin $n$ to advance the bar $l$, and the limit of the downward movement of the cone is had when the jaws $j\,k$ come together. The upward movement of the cone $o$ allows the spring $h''$ to advance the bar $h$ and the spring $l''$ to recede the bar $l$, and with the limit of the ascent of the cone $o$ the springs will have opened the jaws $j\,k$ to their full capacity. The cone $o$ is advanced and receded by a thumb-nut $q$ on the end of the stem $p$, and in order to guard the stem and insure a straight travel of the cone the stem $p$ passes through a collar $r$, having a flange $r'$, which enters a hole in the center $b$, and by which the collar $r$ is snugly attached, and at the same time is capable of removal, when desired, for the withdrawal of the cone $o$ and stem $p$, and the flange $r$ can also be utilized as a limit-stop for the upward movement of the cone, the downward movement being limited by the contact of the thumb-nut $q$ with the collar $r$, so that the cone $o$ cannot be traveled too far in either direction. The head or block A at its head end and rear side has projecting out therefrom in the construction shown a pin $s$, by means of which the tool as a whole can be attached to the tail-stock of a watch-maker's lathe in the usual manner of attaching drills and other tools. The adjustment of the jaws $j\,k$ in relation to the center of the cutter $g$ is one that when the jaws are closed the center of the tool $g$ is in line with the center of the hole into which the jewel is to be bushed or inserted, and as the jaw $j$ is connected with the sliding bar $h$, which carries the tool or cutter $g$, it will be seen that the movement of the jaw $j$ inward moves the tool correspondingly, and as the jaw $j$ and the jaw $k$ move simultaneously, it follows that each jaw moves half of the distance required to move the jaws to receive a jewel of any given size, and consequently the cutter $g$ is moved only half the diameter of the jewel, the result being that the lip of the tool $g$ will move half the diameter of the jewel and will cut equidistant from the center of the hole to be bushed, and such cutting will be the exact diameter of the jewel to be inserted.

In use the tool is attached to the tail-block by the pin $s$ and the jaws are closed, and the plate or other article which is to receive the jewel is adjusted in the head-block of the lathe with the hole to be bushed centering in the cutter $g$. The jaws are then opened, and the jewel to be inserted is dropped between the jaws $j\,k$ and the jaw closed thereonto by running down the cam $o$ through the stem $p$ and thumb-piece $q$, and when the jewel is firmly clasped by the jaws $j\,k$ the device is ready for use, and as the plate or other article is rotated from the lathe head-block the cutter $g$ will act and cut around the hole to be bushed a hole of the exact diameter for the jewel, into which the jewel can be placed and secured as usual. The jaws $j\,k$ should have a range of action capable of clamping the largest, smallest, and intermediate sized jewels, and, as the cutter $g$ has the same range of travel as one-half of the jaws, it follows that the hole cut will be of the diameter at which the jaws $j\,k$ stand apart, which must be the diameter of the jewel held by the jaws. The cutter being centered at the start with the hole to be bushed, it follows that the tool or cutter $g$, when adjusted to the size of the jewel, will cut equidistant around the hole to be bushed, the result being a receiving-hole for the jewel into which the jewel will fit snugly.

The tool as a whole is very simple in construction, and can be attached to the tail-stock of an ordinary watch-maker's lathe, and can be made to clamp jewels of varying sizes, and by the action of clamping such jewel the cutter will be adjusted to correspond with the jewel, so that the clamping of the jewel and the adjustment of the cutter are both had by the same operation.

What I claim as new, and desire to secure by Letters Patent, is—

1. A jewel-setting tool having movable jaws to clamp the jewel, and a cutter movable with the jaws for adjusting the tool with the clamping of the jaws, substantially as and for the purposes specified.

2. The combination, in a watch-maker's tool for setting jewels, of two movable jaws, a cutter connected with one of said jaws, and an adjusting device for moving the jaws and cutter simultaneously, substantially as and for the purposes specified.

3. The combination, with movable jaws for clamping a jewel, of a cutter connected with one of the jaws and movable therewith, substantially as and for the purposes specified.

4. The movable jaws $j\ k$, operated by sliding bars moving in opposite directions, in combination with a cutter carried by one of the bars, substantially as and for the purposes specified.

5. The cutter $g$, shank $f$, sliding bar $h$, and movable jaw $j$, connected with the bar $h$, in combination with the movable jaw $k$ and sliding bar $l$, connected with the jaws $k$, for adjusting the jaws and cutter simultaneously, substantially as specified.

6. The sliding bar $h$, carrying a cutter, and jaw $j$, connected with the bar $h$, in combination with the jaw $k$ and sliding bar $l$, connected with the jaw $k$, substantially as and for the purposes specified.

7. The sliding bar $h$, carrying a cutter and a clamping-jaw, in combination with the sliding bar $l$, carrying a clamping-jaw $k$, pin $m$ on the bar $h$, pin $n$ on the bar $l$, and cone $o$, engaging the pins $m\ n$, substantially as and for the purposes specified.

8. The sliding bar $h$, carrying the cutter and a clamping-jaw, spring $h''$, and pin $m$, in combination with the sliding bar $l$, carrying a clamping-jaw, spring $l''$, pin $n$, and cone $o$, substantially as and for the purposes specified.

9. The head or block A, carrying a cutter and clamping-jaws movable in unison, and having a pin $s$, for attaching the head or block in position, substantially as and for the purposes specified.

10. The head or block A, in combination with clamping-jaws for holding a jewel, and a cutter movable with one of the jaws, substantially as and for the purposes specified.

11. The head or block A, in combination with the sliding bar $h$, carrying a cutter and a clamping-jaw, and sliding bar $l$, carrying a clamping-jaw, substantially as and for the purposes specified.

12. The head or block A, in combination with the sliding bar $h$, carrying a cutter and a clamping-jaw, sliding bar $l$, carrying a clamping-jaw, pins $m\ n$, and cone $o$, substantially as and for the purposes specified.

JOSHUA THOMAS.

Witnesses:
O. W. BOND,
M. L. PRICE.